US010834567B2

(12) United States Patent
Watson et al.

(10) Patent No.: US 10,834,567 B2
(45) Date of Patent: *Nov. 10, 2020

(54) BROADCASTING A DEVICE STATE IN A WIRELESS COMMUNICATION NETWORK

(71) Applicant: APPLE INC., Cupertino, CA (US)

(72) Inventors: Robert D. Watson, Menlo Park, CA (US); Sriram Hariharan, San Jose, CA (US); Ganesha Adkasthala Ganapathi Batta, Cupertino, CA (US); Jason Giles, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/425,352

(22) Filed: May 29, 2019

(65) Prior Publication Data

US 2019/0281437 A1 Sep. 12, 2019

Related U.S. Application Data

(63) Continuation-in-part of application No. 15/696,358, filed on Sep. 6, 2017, now Pat. No. 10,349,259.
(Continued)

(51) Int. Cl.
*H04W 8/00* (2009.01)
*H04R 1/10* (2006.01)
(Continued)

(52) U.S. Cl.
CPC .......... *H04W 8/005* (2013.01); *H04R 1/1016* (2013.01); *H04W 4/08* (2013.01);
(Continued)

(58) Field of Classification Search
CPC .. B41J 2/0057; B41M 5/0011; B41M 5/0256; B41M 7/0027; H04M 1/6058;
(Continued)

(56) References Cited

U.S. PATENT DOCUMENTS 9,743,171 B1 * 8/2017 Anderson ............ H04R 1/1041
10,349,259 B2 * 7/2019 Watson ................... H04W 4/80
(Continued)

FOREIGN PATENT DOCUMENTS

CN 105309040 2/2016
CN 105493508 4/2016
(Continued)

*Primary Examiner* — Tan H Trinh
(74) *Attorney, Agent, or Firm* — Fay Kaplun & Marcin, LLP (57) ABSTRACT

Apparatuses, systems, and methods broadcast a device state in a wireless communication network. A wireless audio output device is configured to be paired with a second wireless device via a first piconet connection, wherein the second wireless device comprises a source of audio data to be output by the wireless audio output device. The wireless audio output device includes a processor configured to detect a change in the state of the wireless audio output device and set a transmission parameter of a broadcast transmission based at least in part on the detected change in the state and a transceiver configured to broadcast an advertising message to the second wireless device including information describing the wireless audio output device via the broadcast transmission.

20 Claims, 5 Drawing Sheets

Network 100

Related U.S. Application Data (60) Provisional application No. 62/398,623, filed on Sep. 23, 2016.

(51) Int. Cl.
*H04W 4/80* (2018.01)
*H04W 52/02* (2009.01)
*H04W 4/08* (2009.01)

(52) U.S. Cl.
CPC ......... *H04W 4/80* (2018.02); *H04W 52/0209* (2013.01); *H04R 2420/07* (2013.01); *Y02D 70/00* (2018.01); *Y02D 70/142* (2018.01); *Y02D 70/144* (2018.01); *Y02D 70/164* (2018.01); *Y02D 70/22* (2018.01); *Y02D 70/23* (2018.01); *Y02D 70/26* (2018.01)

(58) Field of Classification Search
CPC ............ H04M 2250/12; H04R 1/1016; H04R 1/1041; H04R 2201/109; H04R 2420/03; H04R 29/001; H04R 5/033; H04R 5/04
USPC ... 455/41.1, 41.2, 41.3, 575.2, 552.1, 575.8, 455/418, 11.1, 569; 381/74
See application file for complete search history.

(56) References Cited

U.S. PATENT DOCUMENTS

| | | | |
|---|---|---|---|
| 2006/0029234 A1* | 2/2006 | Sargaison | H04M 1/6058 381/74 |
| 2007/0076897 A1* | 4/2007 | Philipp | H04R 1/1041 381/74 |
| 2007/0297618 A1 | 12/2007 | Nurmi et al. | |
| 2010/0246836 A1* | 9/2010 | Johnson, Jr. | H04R 5/04 381/58 |
| 2010/0246846 A1* | 9/2010 | Burge | H04R 1/1041 381/74 |
| 2011/0286615 A1* | 11/2011 | Olodort | H04R 1/1025 381/311 |
| 2013/0343585 A1 | 12/2013 | Bennett et al. | |
| 2014/0242964 A1* | 8/2014 | Seo | H04M 1/6058 455/418 |
| 2015/0105117 A1* | 4/2015 | Larson | H04M 1/6058 455/518 |
| 2015/0264474 A1* | 9/2015 | Seo | G06F 3/165 381/74 |
| 2015/0289124 A1* | 10/2015 | Palin | H04W 8/005 455/41.2 |
| 2015/0341904 A1* | 11/2015 | Ryu | H04M 1/7253 455/458 |
| 2016/0037486 A1* | 2/2016 | Wentzloff | H04W 52/0229 370/329 |
| 2016/0198198 A1* | 7/2016 | Iwami | H04N 21/2385 725/116 |
| 2016/0366263 A1* | 12/2016 | Song | H04W 4/90 |
| 2017/0195769 A1* | 7/2017 | Chang | H04R 1/1016 |
| 2017/0265164 A1* | 9/2017 | Wiser | H04W 72/005 |
| 2017/0366973 A1* | 12/2017 | Young | H04W 12/08 |
| 2017/0374622 A1* | 12/2017 | Visuri | H04W 52/0254 |
| 2018/0220220 A1* | 8/2018 | Eim | H04R 1/1016 |
| 2018/0242064 A1* | 8/2018 | Honeycutt | A45F 5/02 |

FOREIGN PATENT DOCUMENTS

| | | |
|---|---|---|
| KR | 2012-0077517 | 7/2012 |
| KR | 2015-0012306 | 2/2015 |
| WO | 2015/178562 | 11/2015 |

* cited by examiner

BROADCASTING A DEVICE STATE IN A WIRELESS COMMUNICATION NETWORK

PRIORITY CLAIM/INCORPORATION BY REFERENCE

The present application claims priority to U.S. Provisional Appln. Ser. No. 62/398,623 filed on Sep. 23, 2016 entitled "Apparatus, Systems and Methods for Broadcasting an Accessory State in a Wireless Communication Network," naming Robert D. Watson, Sriram Hariharan, Ganesha Adkasthala Ganapathi Batta, and Jason Giles as inventors, the entirety of this application being incorporated by reference herein.

BACKGROUND

Wireless communication systems are rapidly growing in both usage and the number of connected devices. A personal area network ("PAN") may be defined as a computer network used for data transmission amongst devices such as computers, telephones, tablets, personal digital assistants, wearables, Internet of Things (IoT) devices, peripherals, etc. For instance, a PAN may be used for communication between the devices themselves (e.g., interpersonal communication), or for connecting one or more devices to a higher level network and the Internet via an uplink, wherein one "master" device takes up the role as internet router. Furthermore, a wireless PAN is a network for interconnecting devices using wireless technologies, such as Bluetooth.

Within the wireless PANs, certain applications may be considered to have "low energy" application profiles based on their operations. For instance, low energy application profiles generally send and receive short pieces of data over a low energy link. These profiles may provide standards, which manufacturers follow to allow devices to use specific technologies, such as Bluetooth, in the intended manner. Accordingly, Bluetooth low energy ("Bluetooth LE") or "Bluetooth Smart" is a wireless PAN technology designed and marketed by the Bluetooth Special Interest Group aimed at applications in the healthcare, fitness, location, beacons, security, and home entertainment industries. Compared to Classic Bluetooth, Bluetooth Smart is intended to provide considerably reduced power consumption and cost while maintaining a similar communication range.

SUMMARY

Some exemplary embodiments are directed at a method performed by a first wireless audio output device configured to be paired with a second wireless device via a first piconet connection, wherein the second wireless device comprises a source of audio data to be output by the first wireless audio output device. The method includes detecting a change in a state of the first wireless audio output device, setting one of a broadcast rate or a broadcast duration of a broadcast transmission based at least in part on the detected change in the state and broadcasting, for reception by the second wireless device, an advertising message including information describing the first wireless audio output device via the broadcast transmission.

Some other exemplary embodiments are directed at a wireless audio output device configured to be paired with a second wireless device via a first piconet connection, wherein the second wireless device comprises a source of audio data to be output by the wireless audio output device. The wireless audio output device includes a processor configured to detect a change in the state of the wireless audio output device and set a transmission parameter of a broadcast transmission based at least in part on the detected change in the state and a transceiver configured to broadcast an advertising message to the second wireless device including information describing the wireless audio output device via the broadcast transmission.

Still other exemplary embodiments are directed at a system that includes a first wireless audio output device configured to be paired with a source wireless device via a first piconet connection, wherein the source wireless device comprises a source of audio data to be output by the first wireless audio output device and a second wireless audio output device configured to be paired with the first wireless audio output device via a second piconet connection, wherein the first wireless audio output device detects a change of state of one of the first wireless audio output device, the second wireless audio output device or the source wireless device and sets one of a broadcast rate or a broadcast duration of a broadcast transmission based at least in part on the detected change in the state and broadcasts, for reception by the source wireless device, an advertising message via the broadcast transmission.

DETAILED DESCRIPTION

The exemplary embodiments may be further understood with reference to the following description and the appended drawings, wherein like elements are referred to with the same reference numerals. The exemplary embodiments describe an apparatus, system and method for broadcasting a device state in a wireless communication network. It should be noted that while the exemplary embodiments described herein refer to broadcasting and advertising in a Bluetooth network, any type of wireless network may implement the systems and methods described herein. Thus, the various embodiments are not limited to a Bluetooth network in general. Furthermore, while exemplary embodiments described herein may relate to a network for use with wireless audio headphones (e.g., wireless earbuds) in communication with a mobile device, the exemplary systems and methods may be applied to connecting any wireless device and are not limited to wireless audio headphones nor any particular mobile device.

Within a wireless network of devices, such as Bluetooth-enabled devices, an exemplary wireless device may operate in a variety of modes depending on required functionality. These modes of operation may include an advertising mode, a scanning mode, a master device mode, a slave device mode, etc. While in advertising mode, the wireless device may periodically transmit advertising information (e.g., advertising beacons or advertising messages) and may subsequently respond with more information upon request from one or more other devices within the network.

During the scanning mode of operation, the wireless device may listen for advertising information transmitted by one or more other devices and may subsequently request additional information if an active scan mode is enabled. Furthermore, while operating in master device mode, the master device may communicate with a plurality of devices within a piconet (e.g., an ad-hoc computer network using Bluetooth technology). Additionally, the wireless device may switch roles wherein the master device becomes the slave device, and vice versa. For example, a headset initiating a connection to a mobile telephone necessarily begins as master by initiating the connection, and then may subsequently operate as the slave device during standard usage.

Through the usage of advertising, short-ranged low-power wireless technologies such as Bluetooth LE allow for the exemplary wireless device to broadcast packets to every device in its local area. The exemplary receiving devices may then act on this information or connect to receive more information. Accordingly, the advertising mode can be used to create a connection between multiple devices. Furthermore, the advertisement sent from the initiating device may be used to transmit specific information in a predefined data format at a predefined transmission rate. Advertising packets may be periodically transmitted on one or more advertising channels, wherein a time interval between packets may be a fixed interval and/or a random delay. In some instances, using a random delay may reduce the possibility of collisions between advertisements transmitted by different wireless devices.

A connection interval defines how often one wirelessly connected device communicates (e.g., broadcasts advertisements) with another device in the network. For instance, an allowable range for a connection interval may be from 7.5 ms to 4000 ms. Accordingly, the connection interval may be the parameter that most affects data rate. Additionally, there may be a predetermined maximum number of packets (e.g., four) sent per connection interval, and each packet may have a predetermined maximum payload size (e.g., up to 20 bits).

As will be described in greater detail below, the information included in the advertisement packets, as well as the transmission rate of the advertisements, may be adjusted based on the state of the exemplary wireless device. The state of the device may include (or be based on) any number of possible factors, such as, but not limited to, a location of the device relative to other equipment (e.g., ear buds in proximity to one another, an ear bud in proximity of a user device, ear buds in a case, ear buds out of a case, a case (e.g., containing ear buds) opening/closing, etc.), a location of the device relative to a user (e.g., in a user's ear(s), out of a user's ears, etc.), a geographical location of the device (e.g., at a user's home/work, in a user's living room, kitchen, etc.) an application running on the device or on a connected device (e.g., a music/video player, a telephone operation, a fitness tracking mode, etc.), a connection state in relation to one or more network devices (e.g., active mode, sleep mode, fitness mode, paired, etc.), etc. It is noted that the location of any device within the network may be determined based on any number of methods, such as but not limited to, relative strength of signal measurements (e.g., received signal strength indicator ("RSSI") data), geographical measurements (e.g., global positioning systems ("GPS") data), etc.), wireless ranging (e.g., based on time of flight), position information broadcast by other devices (e.g., beacons, GPS data from other devices), or combinations thereof.

In the example of the wireless earbuds, sensors such as optical sensors, accelerometers or any other type of sensor may be included in the wireless earbuds to detect a current state of the wireless earbuds. For example, the optical sensor(s) or accelerometer(s) may detect when a wireless earbud is placed in a user's ear or removed from the user's ear. Similarly, these sensors may also be used to detect when the wireless earbuds are placed in their case, removed from the case or a change in the state of the case, e.g., lid open or closed.

Figure 1:
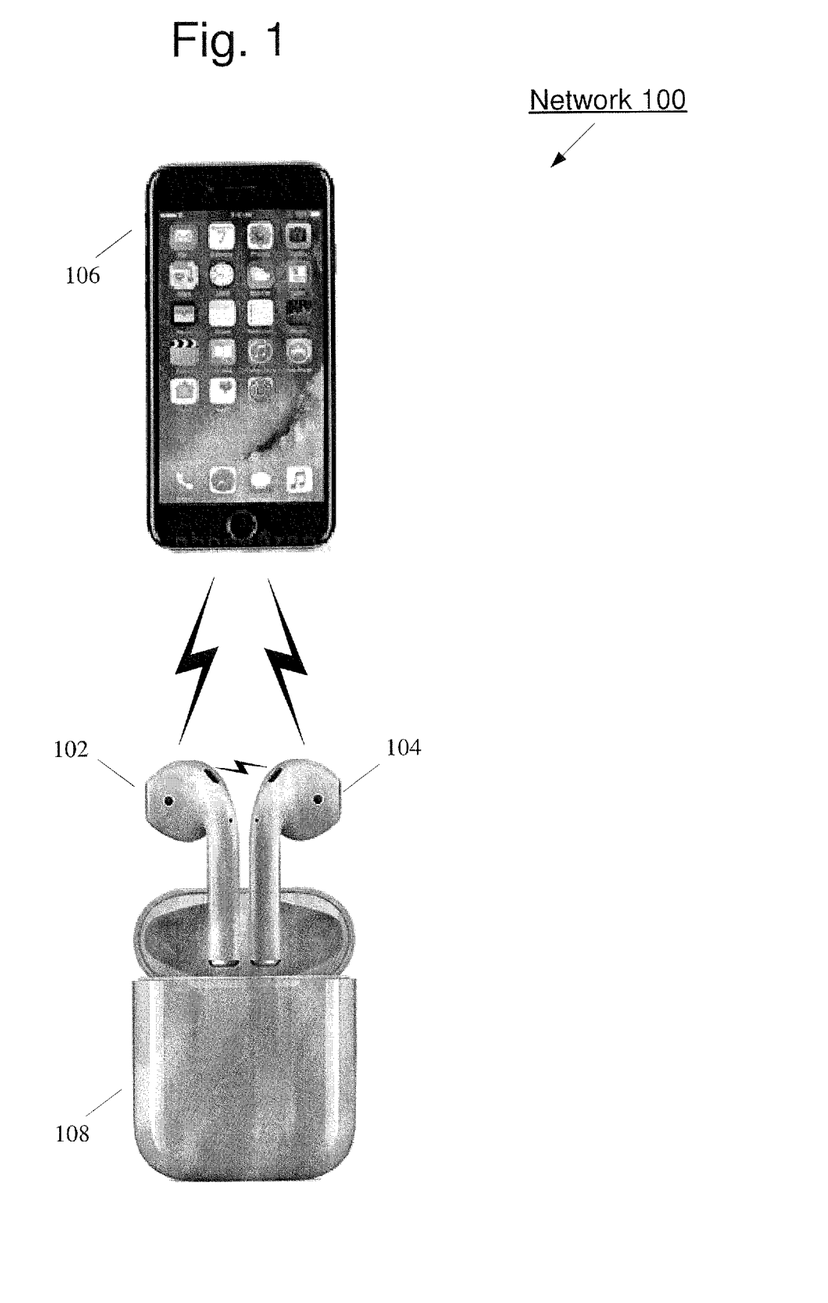
FIG. 1 shows an exemplary embodiment of a short-range low-power network including a pair of wireless audio headphones (e.g., wireless earbuds) in communication with a mobile device (e.g., a mobile telephone, a computer tablet, etc.).

FIG. 1 shows an exemplary embodiment of a short-range low-power network 100 including a pair of wireless audio buds 102, 104 (e.g., ear buds or wireless headphones) in communication with a user device 106 (e.g., a mobile telephone, a tablet computer, wearable, etc.). It is noted that the use of the pair of wireless audio buds 102, 104 is only an example of a type of device connected to the network 100. Additional devices may include, for example, Bluetooth-enabled hands-free headsets, wireless speakers, intercoms, fitness tracking devices, sensors, automobile sound systems, desktop and laptop computers, tablet computers, etc. Furthermore, in devices that have multiple ear buds, such as the wireless audio buds 102, 104, the broadcasting functionality may be shared and/or transferred between each of the ear buds. For instance, one bud (e.g., wireless audio bud 102) may be in active connection with a wirelessly paired device (e.g., user device 106) while another bud (e.g., wireless audio bud 104) may be in an advertising state.

According to the exemplary embodiments described herein, the wireless audio buds 102, 104 may broadcast advertising packets that include status information, such as a device state of the wireless audio buds 102, 104. While the user device 106 is within range (e.g., in proximity) of the wireless audio buds 102, 104, the user device 106 may receive the advertising packets and act based on the status information in the advertising broadcast payload. For instance, the user device 106 may inform a user that the wireless audio buds 102, 104 are nearby. Further, the user device 106 may provide user-directed functionality based on the status information in the advertising broadcast payload. For example, the user device 106 may perform a function, such as answering an incoming call or starting audio playback when one or both of the wireless audio buds 102, 104 are placed in the user's ear. In a further example, the user device 106 may terminate a telephone call or pause audio playback when one or both of the wireless audio buds 102, 104 are removed from the user's ear. From these examples, it can be seen that based on the status information associated with either or both of the wireless audio buds 102, 104 as indicated in an advertising broadcast payload (e.g., indicated through a connection between the user device 106 and the wireless audio buds 102, 104), the functionality of a device such as user device 106 may be controlled.

Accordingly, the information in the broadcast advertising packets may be specific to the type of device broadcasting, e.g., the wireless audio buds 102, 104. Further, the information in the broadcast advertising packets may be specific to a current device state, e.g., of the wireless audio buds 102, 104. It should be noted that the user device 106 may be configured to perform any functionality based on a current state or a change of state of the wireless audio buds 102, 104. For example, an individual user of the user device 106 may, through a configuration application, define the operations or functionalities that should be performed by the user device 106 when detecting a state or change of state of the wireless audio buds 102, 104 as indicated by the advertising packets.

The exemplary wireless audio buds 102, 104 may also broadcast additional information that is encrypted to ensure that only paired devices (e.g., the user device 106) may decrypt and process the information. For instance, this information may include, but is not limited to, accurate battery level information, a current audio state of a device (e.g., the wireless audio buds 102, 104 and/or the user device 106), identification information related to any currently connected paired devices (e.g., the wireless audio buds 102, 104 and/or the user device 106), etc.

The exemplary wireless audio buds 102, 104 may also be in communication with a peripheral component, such as a storage case 108. In addition to storing the wireless audio buds 102, 104, the storage case 108 also may be capable of charging the wireless audio buds 102, 104. Furthermore, as a peripheral component, this storage case 108 may also be characterized by any number of device states, such as but not limited to, an open case state (e.g., wherein a lid on the case 108 is open), a closed case state (e.g., wherein a lid on the case 108 is closed), a bud charging state (e.g., wherein batteries of the wireless audio buds 102, 104 are being charged while stored in the case 108), an idle state (e.g., wherein the wireless audio buds are simply being stored in the case 108), a case charging state (e.g., where a battery included in the case 108 is being charged), etc. Any of these case device states may be communicated from the case 108 to any of the network devices (e.g., the wireless audio buds 102, 104 and/or the user device 106). Additionally, or alternatively, the wireless audio buds 102, 104 may be capable of detecting the device state of the case 108 and/or the wireless audio buds 102, 104 may feature a corresponding device state for one or more of those of the case 108 (e.g., a state of being charged or stored in the case 108, etc.).

According to some embodiments, a change in the device state (e.g., from case closed to case open) may trigger any number of actions, e.g., from either or both of the wireless audio buds 102, 104 and/or the user device 106. For instance, the change in state of the case 108 may trigger a broadcast from either or both of the wireless audio buds 102, 104, a change in the payload of a broadcast packet, a change in an advertising broadcast rate of the transmission, a change in an advertising broadcast duration of the transmission, etc. By changing the broadcast rate, such as increasing the rate, the user device 106, as well as any other nearby network-enabled devices, may receive and act quickly upon the change in device state. Furthermore, by changing the broadcast duration (such as increasing the duration upon the change in device state), the user device 106, as well as any other nearby devices configured to receive the advertisements, may be provided with a longer time frame during which advertisements may be detected and a connection with either or both of the wireless audio buds 102, 104 can be made.

In addition to a change in device state triggering a change in the advertising broadcast rate and/or broadcast duration, the broadcast rate and/or duration may be modified by the type of device state. For instance, the wireless audio buds 102, 104 may be stored in the case 108 while not in use (e.g., for storage, for charging, for configuration, for software updating, etc.). One type of device state may indicate that the wireless audio buds 102, 104 are "in the case" or "the storage case is closed." Another device state may indicate that the wireless audio buds 102, 104 are "out of the case" or "the storage case is open." Therefore, the payload of the broadcast packet may change to indicate that state, e.g., that the case 108 has been opened. This updated information may be included in a packet that is then advertised more aggressively (e.g., increasing the advertising broadcast rate from 180 ms to 20-30 ms, increasing the advertising broadcast duration from 30 seconds to 60 seconds, etc.).

As a result of the change in advertising parameters and/or change in advertisement payload, a device such as the user device 106, can more quickly become aware that the wireless audio buds 102, 104 are about to be put into use and/or to connect with either or both of the wireless audio buds 102, 104. Alternatively, the broadcast packet may change to indicate that the case 108 has been closed. This updated information packet may be advertised less aggressively (e.g., decreasing the advertising broadcast rate, etc.) or not advertised at all for a period of time. This can allow any/all of the wireless audio buds 102, 104, the case 108, and the user device 106 to conserve resources (e.g., battery life, etc.) while the wireless audio buds 102, 104 are stored in the case 108 and, thus inactive or no longer in use.

Additional device states may include further location indications from the wireless audio buds 102, 104, such as "in the user's ears" and "out of the user's ears." Upon a change in the in-ear status, the broadcast packet may change to indicate that the wireless audio buds 102, 104 are in or out of the user's ears, using an increased advertising broadcast rate to notify the user device 106 and/or any other nearby network devices. As a result, a connected device such as the user device 106 can more quickly identify the change in state (e.g., in-ear status) and execute one or more functions triggered by the state change. Further device states may be related to applications and operations of either the wireless audio buds 102, 104 and/or the user device 106, such as playing music, making a telephone call, listening to voice mail, using an external speaker, etc. Moreover, these applications and/or operations may be controlled, at least in part, by a device state or device state change. For example, an in-ear/out-of-ear state change or a connected/stored state change (or any other state change) may serve as a trigger for an application and/or operation state change (e.g., starting an application, displaying a graphical user interface ("GUI") on the user device 106 such as a GUI "pop-up" notification, answering/hanging up a telephone call, pausing/resuming media playback, etc.).

Figure 2:
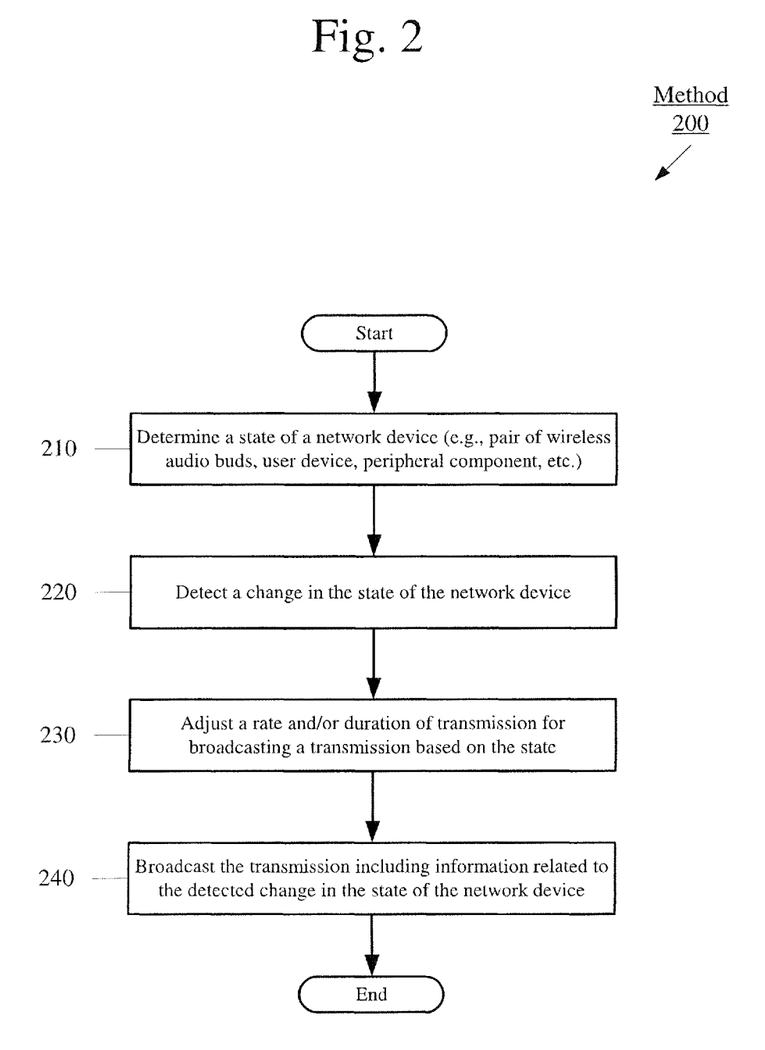
FIG. 2 shows an exemplary method for broadcasting a device state in a wireless communication network according to various embodiments described herein.

FIG. 2 shows an exemplary method 200 for broadcasting a device state in a wireless communication network according to various embodiments described herein. The method 200 will be described with reference to the network 100 including the wireless audio buds 102, 104 and the user device 106. Each of the wireless audio buds 102 and 104 may perform the operations of method 200. In some implementations, the case 108 also may perform some or all of the operations of method 200. According to an exemplary embodiment, the wireless audio bud 102 may serve as a primary audio bud in an advertising state with the user device 106. Thus, the method 200 will be described as being performed by the wireless audio bud 102, but as described above, any of the devices of the network 100 may perform the method 200.

In 210, the wireless audio bud 102 may determine a state of a network device. The network device may be itself (e.g., a state of the wireless audio bud 102) or a state of another network device (e.g., a state of the wireless audio bud 104, the user device 106, or the case 108). As discussed above, the state of the network devices may be related to any number of possible scenarios, such as an in-use or active state, an idle or sleep state, a paired state, an application specific state (e.g., in media player mode, in fitness tracking mode, in voice call mode, etc.), etc. The state of the device may also include peripheral states, such as the storage case 108 in an open state or a closed state. The state of the device may further include a location-based state, such as a proximity to another device, a geographical location of the device, a location relative to a user (e.g., in ear, out of ear, etc.), etc.

This determination of the network device states may be performed in a variety of manners. For example, when determining its own state, the wireless audio bud 102 may include sensors (e.g., optical sensors, accelerometers, etc.) that can detect a current state of the wireless audio bud. When determining a state of a further device, such as the user device 106, the wireless audio bud 102 may receive a Bluetooth broadcast that includes the current state of the user device. In a further example, the wireless audio bud 102 may detect the state of another device using the sensors, e.g., an optical sensor indicating the lid of the case 108 is closed with the wireless audio bud 102 inside. Those skilled in the art will understand that there may be other manners of determining network device states and the above are only exemplary.

It should be noted that the term network device is not limited to devices which are actually connected to a network. For example, the case 108 may not have the capability of wirelessly communicating with other devices. However, the case 108 may still be considered to be a network device because the other devices (e.g., the wireless audio bud 102) may determine a state and/or a change of state for the case 108 (e.g., lid open or closed) even without the case 108 having the ability to communicate wirelessly. In addition, there may be no current active network connection between the user device 106 and the wireless audio bud 102, but both these devices may be considered network devices. Thus, the term network device may include any devices that are capable of communicating with other devices or any device for which another device may determine a state.

In 220, the wireless audio bud 102 may detect a change in its own state or in the state of another network device. For example, the wireless audio bud 102 may detect an activation of either of the wireless audio buds 102, 104 or the user device 106. Additionally, the wireless audio bud 102 may detect an opening of the storage case 108, a change in the proximity between devices or a specific location of the device(s) relative to the user and/or geography. The wireless audio bud 102 may detect a start to a specific application, such as the user of the user device 106 operating a voice call application, a fitness tracking application, a media player application, etc.

In 230, the wireless audio bud 102 may adjust a rate and/or duration of transmission for a broadcasted advertisement transmission based on the detected change in the state. Furthermore, the change in detected device state may also adjust a payload size or content for the broadcasted advertisement transmission. Any of the detected changes in the state of the network device may be related to an immediate change in the usage of a network device. For example, the opening of the audio bud storage case 108 may indicate that the wireless audio buds 102, 104 are about to be put into use by the user. Thus, it would be advantageous to aggressively advertise the change in device state within the network 100. Conversely, the closing of the audio bud storage case 108 may indicate that the wireless audio buds 102, 104 are about to be put out of use. Thus, it would be advantageous to reduce or cease any advertisement broadcasting by either of the wireless audio buds 102, 104.

According to these examples, an action such as the opening of the storage case 108 may increase the rate and duration of the advertisement broadcast from, e.g., a 20 ms connection interval every 90 seconds to, e.g., a 30 ms connection interval every 300 ms. Accordingly, whenever there is a detected change in the state of a network device, such as an activation or a presumed activation of a device, the rate of an advertisement broadcast transmission may increase (or decease for deactivation) for a predetermined period of time. As a result, there can be more and/or longer opportunities for another device to detect and act on (or in accordance with) the advertised state information. Additionally, the rate and/or content of advertisement broadcast transmissions can once again be modified when a further change in a network device state is detected.

In 240, the wireless audio bud 102 may broadcast the transmission for reception by the second wireless device, including information related to the detected change in the state of the network device. As described above, the wireless audio bud 102 may broadcast advertisement information to be received by another device in the network 100, such as the user device 106. This advertisement information may include information related to the type and identity of any of the devices within the network 100 as well as current state information of these various devices. For instance, the broadcast information may advertise that the wireless audio buds 102, 104 have been removed from their storage case 108 (e.g., the case 108 has, been opened) and placed in to the user's ears. Accordingly, the transmission of the advertisement broadcast may incorporate any number of alterations as discussed above in 230, such as changes to the transmission rate, changes to the transmission duration, changes to the payload size of the transmission, etc.

Figure 3:
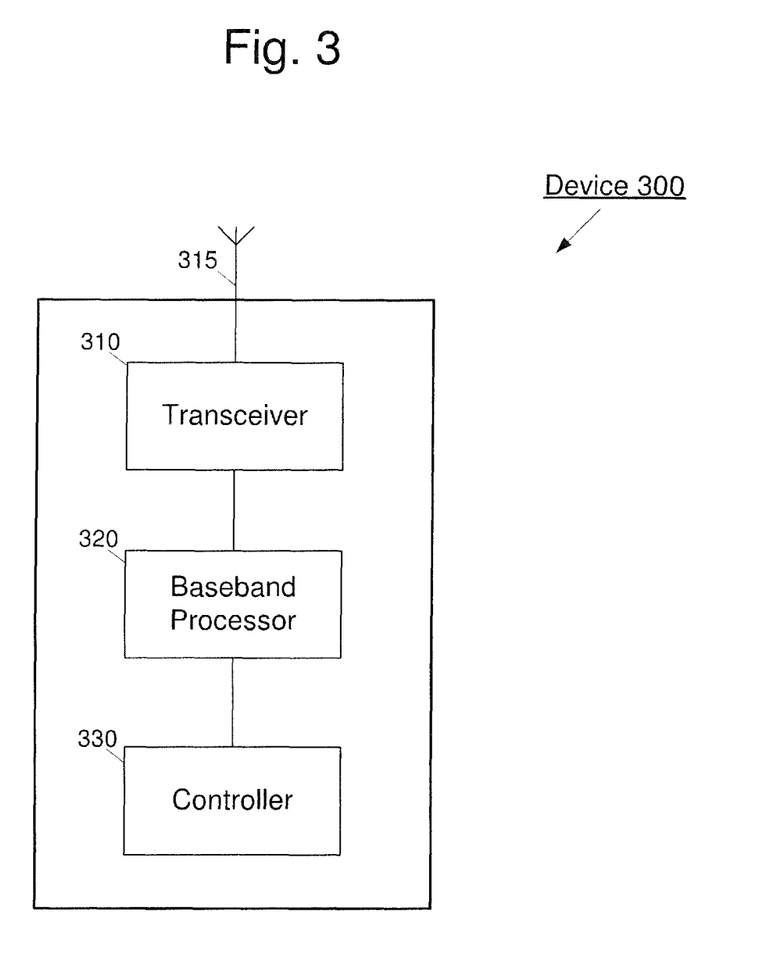
FIG. 3 shows an exemplary device (e.g., wireless audio buds) for broadcasting a device state in a wireless communication network according to various embodiments described herein.

FIG. 3 shows an exemplary device 300 (e.g., a wireless audio bud) for broadcasting a device state in a wireless communication network according to various embodiments described herein. The device 300 may represent any electronic device (e.g., wireless audio bud 102) that is configured to perform wireless functionalities, such as but not limited to communicating with a master device (e.g., the source device 106) as well as a slave device (e.g., the other wireless audio bud 104). However, it is noted that the device 300 may also represent any of the other components of the exemplary network 100, such as the user device 106, a peripheral device (e.g., the case 108) and/or the other audio bud 104.

Furthermore, it is noted that the device 300 is not limited to audio buds and may represent any portable wireless device, such as, but not limited to a wearable computing device, a mobile phone, a tablet computer, a personal computer, a VoIP telephone, a wearable, an ioT device, etc. The device 300 may also be a stationary client device, such as a desktop computer.

The exemplary device 300 may include a transceiver 310 connected (directly or indirectly) to an antenna 315, a baseband processor 320, and a controller 330, as well as other components. The other components may include, for example, a memory, a battery, ports to electrically connect the device 300 to other electronic devices, etc. The controller 330 may control the communication functions of the transceiver 310 and the baseband processor 320. In addition, the controller 330 may also control non-communication functions related to the other components, such as the memory, the battery, etc. It is noted that the controller 330 may also be implemented and/or perform operations associated with an applications processor. The transceiver 310 may include a hardware transmitter, such as a Bluetooth beacon or other Bluetooth LE-enabled device capable of broadcasting advertisements to other nearby electronic devices (e.g., the user device 106).

According to some embodiments, the baseband processor 320 may be a chip compatible with a wireless communication standard, such as Bluetooth. The baseband processor 320 also may be implemented as a combination chip (or system on a chip) that can support two or more wireless communication standards, such as Bluetooth and Wi-Fi. The baseband processor 320 may be configured to execute a plurality of applications of the device 300. For example, the applications may include the above-referenced methods related to the exemplary embodiments, such as but not limited to, broadcasting a device state in a wireless communication network as described in method 200 of FIG. 2. Additionally, the transceiver 310 may also be configured to execute a plurality of applications of the device 300. For example, the applications may include the above-referenced methods related to the exemplary embodiments, such as but not limited to, broadcasting a device state in a wireless communication network as described in method 200 of FIG. 2.

Figure 4:
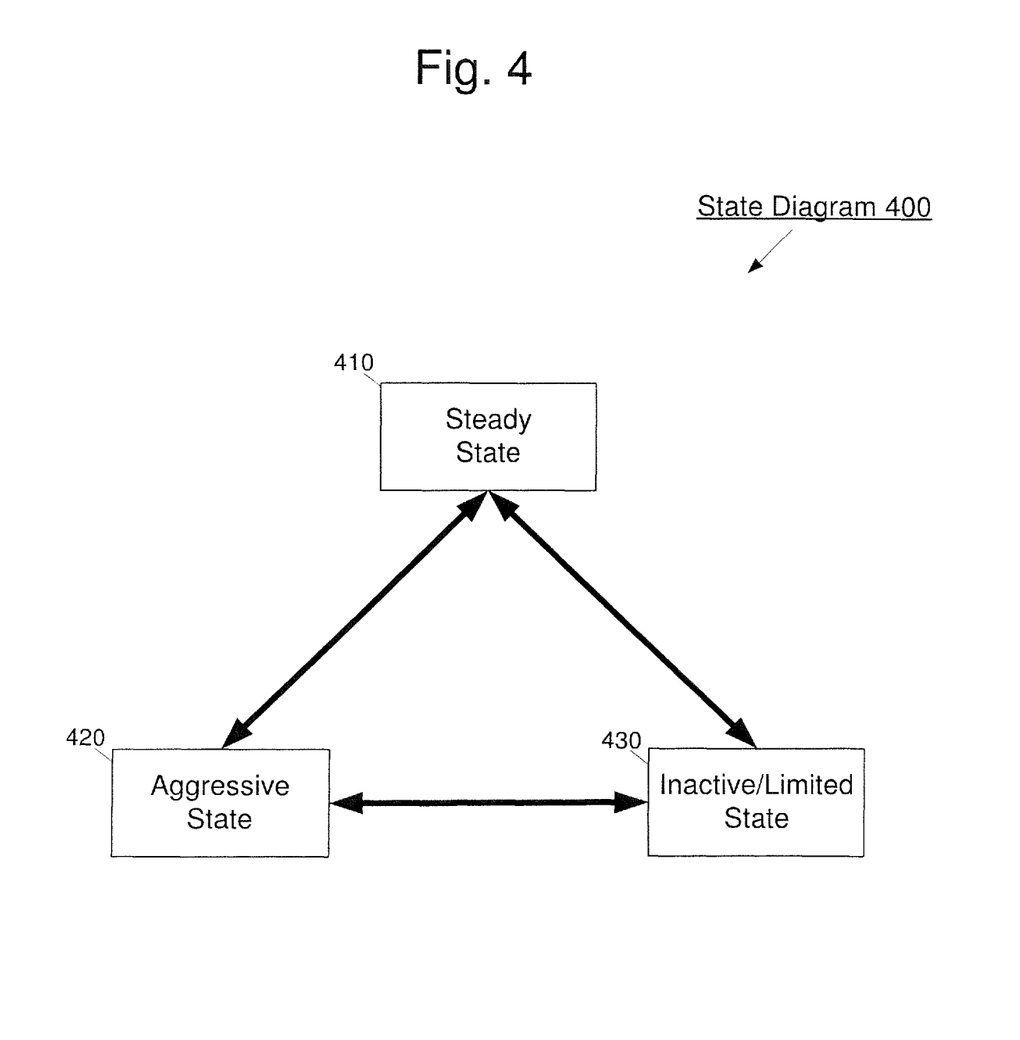
FIG. 4 shows an exemplary state diagram related to a device (e.g., a wireless audio bud) for broadcasting a device state in a wireless communication network according to various embodiments described herein.

FIG. 4 shows an exemplary state diagram 400 related to a device (e.g., the wireless audio bud 102) for broadcasting a device state in a wireless communication network according to various embodiments described herein. The state diagram 400 will be described with reference to the exemplary embodiment illustrated in FIG. 1, wherein a device such as the wireless audio bud 102 may be stored in the exemplary case 108 with another wireless audio bud 104.

Examples of the device state for the wireless audio bud 102 may include, but are not limited to, a steady state 410 (e.g., standard operating state), an aggressive state 420 (e.g., an in-use state or about-to-be-used state) and a limited or inactive state 430 (e.g., an out-of-use state). Although presented with respect to a wireless audio bud, similar states can be implemented by other devices, such as the case 108 and/or the user device 106. Each of the states may impact the broadcast advertising operations (e.g., the rate at which advertisements are transmitted and/or the type/content of advertisements transmitted) of the wireless audio bud 102. For instance, the steady state 410 may allow the wireless audio bud 102 to broadcast advertisement packets according to regular operations.

The aggressive state 420 may allow the wireless audio bud 102 to broadcast advertising packets more aggressively (as compared to the steady state 410), such as any/all of: at a higher rate, for a longer duration, with an increased payload size, with a different payload, etc. The limited or inactive state 430 may allow less aggressive broadcasting (as compared to the steady state 410), including by any/all of decreasing the broadcasting rate, decreasing the broadcasting duration, decreasing the payload size, including a different payload, etc. It is noted that the inactive state 430 may refer to the wireless audio bud 102 being inactive (e.g., not in-use) and does not necessarily refer to an inactive transmission state of the wireless audio bud 102. In other words, the wireless audio bud 102 may continue to broadcast advertisement packets while in the limited/inactive state 430, just at a reduced rate, duration, packet size, etc. It should be noted that exemplary rates and durations for the various states have been provided above. The exemplary embodiments are not limited to these rates and/or durations, but these are merely provided to illustrate exemplary relative differences between the various states.

While operating in the steady state 410, the wireless audio bud 102 may transition to either the aggressive state 420 or the limited/inactive state 430 based on a detected change at any or all of the wireless audio bud 102, the other wireless audio bud 104, the user device 106, the storage case 108, or another network or peripheral device in communication with the wireless audio bud 102. For instance, as discussed above, the wireless audio bud 102 may detect a state change, such as that one of the wireless audio buds 102, 104 is in an in-ear state when a user places either of the wireless audio buds 102, 104 in the user's ear(s). It is noted that the placement and location of the wireless audio buds 102 is merely one example of a detectable state of the wireless audio bud 102 and that the techniques can be applied in relation to any state change. Additional states may include opening/closing the storage case 108, crossing a battery threshold of the wireless audio buds 102 or the user device 106, a charging state of the wireless audio buds 102, user input (e.g., sensory input, such as a double tap) at either the wireless audio buds 102 or the user device 106, etc.

In one example, a change from an out-of-ear state to an in-ear state may transition the wireless audio bud 102 from the steady state 410 to the aggressive state 420. Such a transition to the aggressive state 420 may change one or more operations, such as increasing the broadcasting rate and/or duration for advertisement packets. As a result of transitioning to the aggressive state 420, an associated device (e.g., the user device 106) may quickly detect the change, enabling one or more corresponding functions or operations, such as, but not limited to, answering a telephone call, starting a media player/file, starting an application, displaying a notification GUI on the user device 106, unlocking a home screen of the user device 106, switching from a speaker audio mode to an in-ear audio mode, etc. It is noted that after a duration in the aggressive state 420, the wireless audio bud 102 may transition back to the steady state 410 (e.g., while remaining in the in-ear state) or directly to the inactive/limited state 430 in some circumstances (e.g., after advertising a shut down or other such inactivity).

Further, another state change may cause the wireless audio bud 102 to enter a different state or to continue operating in the aggressive state 420 with one or more modified parameters. For example, if wireless audio bud 102 is removed and placed into the case 108, it may enter the limited/inactive state 430. As another example, while in the aggressive state 420, a change from an in-ear state to an out-of-ear state may cause the wireless audio bud 102 to remain in the aggressive state 420, but with one or more modified parameters (e.g., a different payload). After the duration of the aggressive state 420 passes, a transition to the steady state 410 may decrease one or more advertising parameters (e.g., the broadcasting rate) for the advertisement packets. The wireless audio bud 102 can remain in the steady state 410 until another state change is detected.

From either of the steady state 410 or the aggressive state 420, the wireless audio bud 102 may transition to the limited/inactive state 430. For instance, the user may transfer the wireless audio bud 102 into the storage case 108 (e.g., an in-case state), which may cause the wireless audio bud 102 to enter the aggressive state 420 to broadcast (or advertise) that it has entered an in-case state or to transition from the steady state 410 to the inactive/limited state 430 directly. Once the wireless audio bud 102 enters the inactive/limited state 430 (e.g., is stored within the case 108), the advertisement broadcasting rate may decrease (or cease). Furthermore, activating the limited/inactive state 430 may trigger one or more operations (e.g., by an associated device), such as, but not limited to, terminating a telephone call, stopping/pausing a media player/file, closing an application, displaying a notification GUI on the user device 106, locking a home screen of the user device 106, switching from an in-ear audio mode to a speaker audio mode, etc.

Figure 5:
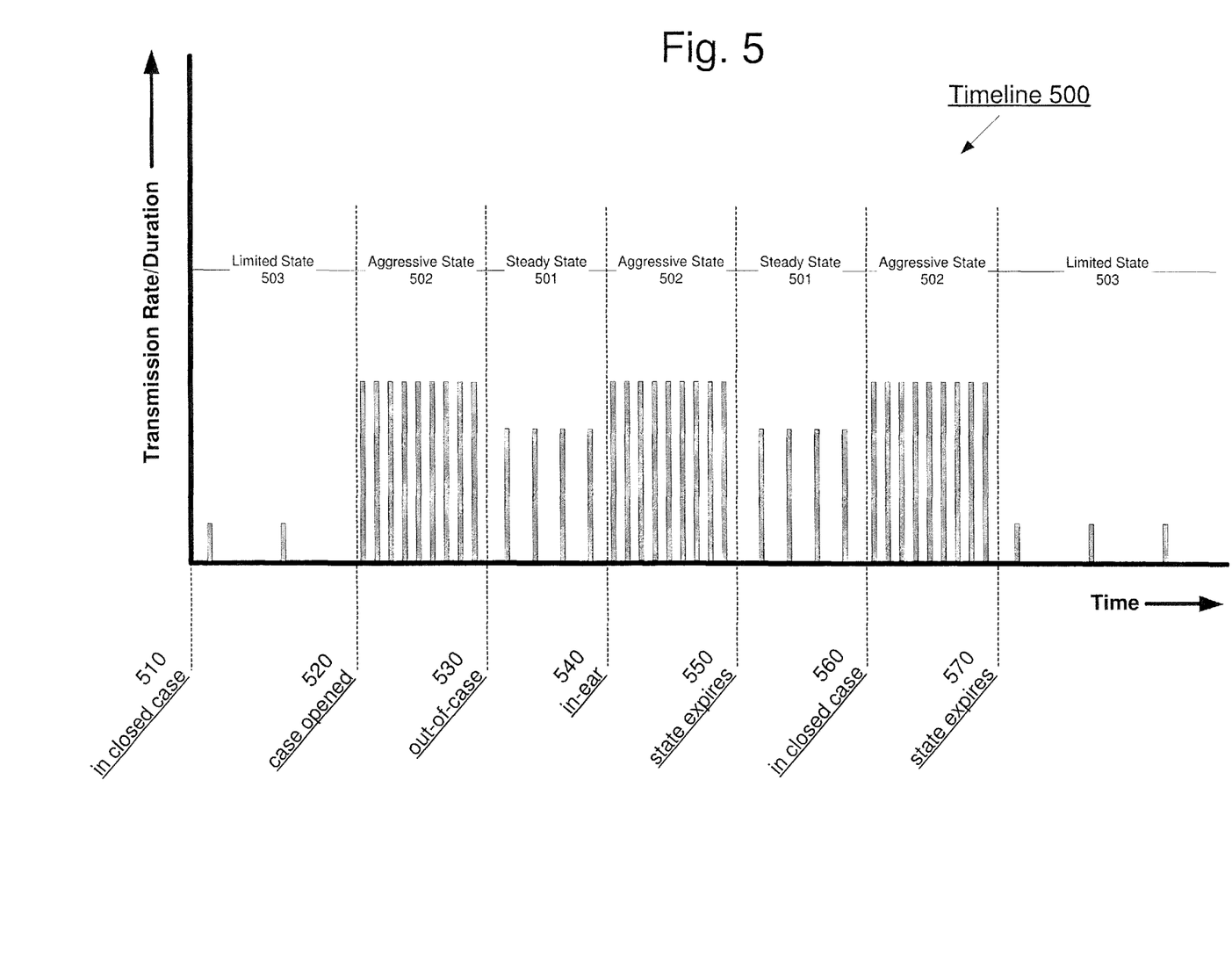
FIG. 5 shows an exemplary timeline related to a device (e.g., a wireless audio bud) for broadcasting a device state in a wireless communication network according to various embodiments described herein.

FIG. 5 shows an exemplary timeline 500 related to a device (e.g., the wireless audio bud 102) for broadcasting a device state in a wireless communication network according to various embodiments described herein. The timeline 500 will be described with reference to the exemplary embodiment illustrated in FIG. 1, wherein a device such as the wireless audio bud 102 may be stored in the exemplary case 108 with another wireless audio bud 104. Furthermore, the operation of the wireless audio bud 102 may include a plurality of operating states, such as, but not limited to a steady state 501, an aggressive state 502 and a limited/inactive state 503. As discussed above, each of these states 501-503 may relate to an advertisement broadcasting characteristic, such as a broadcasting rate, broadcasting duration, a payload size, etc.

According to the exemplary timeline 500, the wireless audio bud 102 may initially be stored in the closed case 108 at 510. During this time, the wireless audio bud 102 may be in the limited/inactive state 503 and may broadcast advertisement packets at a limited transmission rate and/or at a limited transmission duration. Since the wireless audio bud 102 is stored in the closed case 108, it may be presumed that the wireless audio bud 102 is inactive. While FIG. 5 is primarily described with respect to representative wireless audio bud 102, the techniques also can be implemented by other devices, such as the bud 104, the user device 106, and/or the case 108.

At 520, the case 108 may be opened (representing a state change) and the wireless audio bud 102 may transition from the limited/inactive state 503 to the aggressive state 502. In the aggressive state 502, the wireless audio bud 102 may broadcast advertisement packets at a greater transmission rate and/or for a greater transmission duration. Since the case 108 for the wireless audio bud 102 has been opened, it may be presumed that the wireless audio bud 102 may be put into use.

After advertising in the aggressive state 502 for a duration (e.g., a predetermined period), at 530 the wireless audio bud 102 may transition from the aggressive state 502 to the steady state 501 (e.g., if there is no other state change). In the steady state 501, the wireless audio bud 102 may broadcast advertisement packets at a moderate or standard transmission rate and/or for a standard transmission duration. Further, the wireless audio bud 102 can continue to monitor its state (and optionally the state of one or more other devices) to determine whether a state change has occurred.

At 540, the wireless audio bud 102 may be placed in the user's ear (e.g., a change in the in-ear state/status) and the wireless audio bud 102 may transition from the steady state 501 to the aggressive state 502. The wireless audio bud 102 can enter the aggressive state 502 to increase the chance of and/or reduce the time required for another device to receive notice of the state change, e.g., so the other device can perform a function or operation. Once again, the wireless audio bud 102 may broadcast advertisement packets at a greater transmission rate and/or for a greater transmission duration. After the duration of the aggressive state 502 expires at 550, the wireless audio bud 102 can return to the steady state 501. During the steady state 501, the wireless audio bud 102 may once again broadcast advertisement packets at a moderate or standard transmission rate and/or for a standard transmission duration.

At 550, the wireless audio bud 102 may be removed from the user's ear while remaining outside of the case 108. Accordingly, the wireless audio bud 102 may transition from the aggressive state 502 to the steady state 501. The wireless audio bud 102 may once again broadcast advertisement packets at a moderate or standard transmission rate and/or for a standard transmission duration. Since the wireless audio bud 102 are out of the case 108, it may be presumed that the wireless audio bud 102 may be put back into use or may be returned to the case 108 for storage and/or charging.

At 560, the wireless audio bud 102 may be removed from the ear (e.g., a change in the in-ear state/status) and returned to the case 108. Accordingly, the wireless audio bud 102 may transition from the steady state 501 to the aggressive state 502. In the aggressive state 502, the wireless audio bud 102 may broadcast advertisement packets at a greater transmission rate and/or for a greater transmission duration to advertise the changed state.

At 570, after the duration of the aggressive state 502, the wireless audio bud 102 may transition to the limited/inactive state 503 and may broadcast advertisement packets at a limited transmission rate and/or at a limited transmission duration (or cease advertising). Alternatively, in some implementations, the wireless audio bud 102 may transition to the steady state 501 before entering the limited state 503.

It will be apparent to those skilled in the art that various modifications may be made in the present disclosure, without departing from the spirit or scope of the disclosed subject matter. Thus, it is intended that the present disclosure cover the modifications and variations of this disclosure provided they come within the scope of the appended claims and their equivalents.

What is claimed is:

1. A method, comprising:
    at a wireless audio output device:
        detecting a change of state of the wireless audio output device or a further wireless device;
        selecting, responsive to the state change, a first advertising state or a second advertising state;
        broadcasting, when the first advertising state is selected, an advertising message at a first rate and/or for a first duration; and
        broadcasting, when the second advertising state is selected, the advertising message at a second rate, lower than the first rate, and/or for a second duration, shorter than the first duration.

2. The method of claim 1, further comprising:
    detecting a further change of state of the wireless audio output device or the further wireless device;
    selecting, responsive to the further state change, the first advertising state, the second advertising state, or a third advertising state; and
    broadcasting, when the third advertising state is selected, a further advertising message at a third rate, lower than the second rate, and/or for a third duration, shorter than the second duration.

3. The method of claim 1, wherein the broadcast is configured for reception by a user device, and the reception of the broadcast by the user device triggers an action at the user device.

4. The method of claim 3, wherein the wireless audio output device is configured to be placed in a first ear of a user and the further wireless device is one of a further wireless audio output device, the user device, or a storage case configured to store the wireless audio output device and the further wireless audio output device,
    wherein the further wireless audio output device is configured to be placed in a second ear of the user.

5. The method of claim 4, wherein both of the wireless audio output device and the further wireless audio output device are configured to be paired with the user device via piconet connections.

6. The method of claim 4, wherein the detected change of state is one of the wireless audio output device and the further wireless audio device being placed into the storage case or taken out of the storage case.

7. The method of claim 1, wherein the advertising message is broadcast for one of a predetermined period of time or until a further change of state is detected.

8. The method of claim 1, wherein the advertising message is encrypted such that it can be decrypted by the further wireless device only when the further wireless device has been previously paired with the wireless audio output device.

9. A wireless audio output device, comprising:
- a processor configured to detect a change of state of the wireless audio output device or a further wireless device and select, responsive to the state change, a first advertising state or a second advertising state; and
- a transceiver configured to broadcast, when the first advertising state is selected, an advertising message at a first rate and/or for a first duration and broadcast, when the second advertising state is selected, the advertising message at a second rate, lower than the first rate, and/or for a second duration, shorter than the first duration.

10. The wireless audio output device of claim 9, wherein the processor is further configured to detect a further change of state of the wireless audio output device or the further wireless device and select, responsive to the further state change, the first advertising state, the second advertising state, or a third advertising state;
    wherein the transceiver is further configured to broadcast, when the third advertising state is selected, a further advertising message at a third rate, lower than the second rate, and/or for a third duration, shorter than the second duration.

11. The wireless audio output device of claim 9, wherein the broadcast is configured for reception by a user device, and the reception of the broadcast by the user device triggers an action at the user device.

12. The wireless audio output device of claim 11, wherein the wireless audio output device is configured to be placed in a first ear of a user and the further wireless device is one of a further wireless audio output device, the user device, or a storage case configured to store the wireless audio output device and the further wireless audio output device,
    wherein the further wireless audio output device is configured to be placed in a second ear of the user.

13. The wireless audio output device of claim 12, wherein both of the wireless audio output device and the further wireless audio output device are configured to be paired with the user device via piconet connections.

14. The wireless audio output device of claim 12, wherein the detected change of state is the wireless audio output device and the further wireless audio device being placed into the storage case or taken out of the storage case.

15. The wireless audio output device of claim 9, wherein the advertising message is broadcast for one of a predetermined period of time or until a further change of state is detected.

16. The wireless audio output device of claim 9, wherein the advertising message is encrypted such that it can be decrypted by the further wireless device only when the further wireless device has been previously paired with the wireless audio output device.

17. A system, comprising:
- a wireless audio output device configured to detect a change of state of the wireless audio output device, select, responsive to the state change, a first advertising state or a second advertising state, broadcast, when the first advertising state is selected, an advertising message at a first rate and/or for a first duration and broadcast, when the second advertising state is selected, the advertising message at a second rate, lower than the first rate, and/or for a second duration, shorter than the first duration; and
- a further wireless audio output device configured to be paired with the first wireless audio output device via a piconet connection,
    wherein the wireless audio output device is further configured to detect a change of state of the further wireless audio output device.

18. The system of claim 17, further comprising:
- a storage case configured to store and charge the wireless audio output device and the further wireless audio output device, wherein the detected changes of state of the wireless audio device and the further wireless audio output device is related to one of (i) a position of the devices in relation to the storage case or (ii) a charging state of the devices.

19. The system of claim 17, wherein the wireless audio output device is further configured to detect a further change of state of the wireless audio output device or the further wireless audio output device, select, responsive to the further state change, the first advertising state, the second advertising state, or a third advertising state, and broadcast, when the third advertising state is selected, a further advertising message at a third rate, lower than the second rate, and/or for a third duration, shorter than the second duration.

20. The system of claim 17, further comprising:
- a user device configured to receive the broadcast, wherein the reception of the broadcast by the user device triggers an action at the user device.

* * * * *

UNITED STATES PATENT AND TRADEMARK OFFICE
CERTIFICATE OF CORRECTION

PATENT NO. : 10,834,567 B2
APPLICATION NO. : 16/425352
DATED : November 10, 2020
INVENTOR(S) : Watson et al.

Page 1 of 1

It is certified that error appears in the above-identified patent and that said Letters Patent is hereby corrected as shown below:

On the Title Page

Related U.S. Application Data item (63):
"Continuation-in-part of application No. 15/696,358, filed on Sep. 6, 2017, now Pat. No. 10,349,259."
Should read:
"Continuation of application No. 15/696,358, filed on Sep. 6, 2017, now Pat. No. 10,349,259."

Signed and Sealed this
Fifth Day of January, 2021

Andrei Iancu
*Director of the United States Patent and Trademark Office*